(12) United States Patent
Puri et al.

(10) Patent No.: US 7,844,350 B2
(45) Date of Patent: Nov. 30, 2010

(54) TESTING OF CONTROL STRATEGIES IN A CONTROL SYSTEM CONTROLLING A PROCESS CONTROL PLANT

(75) Inventors: Jagmeet Singh Puri, Bangalore (IN); Sathiskumar Gnanasekaran, Madurai (IN)

(73) Assignee: Honeywell International Inc., Morristown, NJ (US)

( * ) Notice: Subject to any disclaimer, the term of this patent is extended or adjusted under 35 U.S.C. 154(b) by 309 days.

(21) Appl. No.: 11/562,464

(22) Filed: Nov. 22, 2006

(65) Prior Publication Data

US 2008/0120522 A1    May 22, 2008

(51) Int. Cl.
*G05B 13/02* (2006.01)
(52) U.S. Cl. .................. 700/30; 700/28; 702/120; 702/182
(58) Field of Classification Search ............. 700/28–32, 700/39; 702/119, 120, 182–185; 703/6
See application file for complete search history.

(56) References Cited

U.S. PATENT DOCUMENTS

| | | | |
|---|---|---|---|
| 5,119,318 A | 6/1992 | Paradies et al. | |
| 5,233,611 A | 8/1993 | Triantafyllos et al. | |
| 5,307,290 A | 4/1994 | Raviglione et al. | |
| 5,436,855 A | 7/1995 | Willafys et al. | |
| 6,014,612 A * | 1/2000 | Larson et al. | 702/183 |
| 6,937,956 B2 * | 8/2005 | Schnarch | 702/108 |
| 7,260,501 B2 * | 8/2007 | Pattipatti et al. | 702/183 |
| 2002/0082736 A1 | 6/2002 | Lech et al. | |
| 2004/0059972 A1 | 3/2004 | Khoche | |
| 2005/0203717 A1 | 9/2005 | Parimi | |
| 2005/0256661 A1 | 11/2005 | Salsbury et al. | |
| 2007/0078530 A1* | 4/2007 | Blevins et al. | 700/29 |
| 2008/0021692 A1* | 1/2008 | Chaudhry et al. | 703/18 |

FOREIGN PATENT DOCUMENTS

| | | |
|---|---|---|
| EP | 1248171 A2 | 10/2002 |
| FR | 2707406 A1 | 1/1995 |
| GB | 704883 A | 3/1954 |

OTHER PUBLICATIONS

Llkka Srilonenl, Teppo Pirttioja. Pekka Appelqvist, Kari Koskinenl and Aame Halm, "Modelling Cooperative Control in Process Automation with Multi-Agent Systems" from IEEE Journal, pp. 260-265, 2004.

(Continued)

*Primary Examiner*—Paul L Rodriguez
*Assistant Examiner*—Sheela Rao
(74) *Attorney, Agent, or Firm*—Narendra R. Thappeta; Anthony Miologos

(57) ABSTRACT

Test cases to test control strategies of a control process are specified in input files. The instructions in the input files are automatically read by a block tester, which interfaces with the control system to issue the instructions. As a test designer can create the instructions in the input files a priori, the tests may be carefully designed to avoid errors, in addition to performing exhaustive tests.

17 Claims, 9 Drawing Sheets

OTHER PUBLICATIONS

Wee Kheng Leow, Siau Cheng Khoo, and Yi Sun, Automated Generation of Test Programs From Closed Specifications of Classes and Test Cases', Proceedings of the 26th International Conference on Software Engineering (ICSE'04), pp. 1-10, 2004, Dept. of Computer Science, National University of Singapore.

An Introduction to Data-Driven Testing in TestComplete downloaded from http://www.automatedqa.com/techpapers/ddtintro/index.asp, pp. 1-8, AutomatedQA, Corp Downloaded Circa Nov. 2006.

* cited by examiner

| | 501 | 502 | 503 | 504 | 505 | 506 | 507 |
|---|---|---|---|---|---|---|---|
| | Instruction Identifier | I/O | No Of Args | Arg1 | Arg2 | | |
| 531 | Setdelay | 1 | 1 | 2000 | | | |
| 532 | SetAccessLevel | 1 | 1 | 1 | | | |
| 533 | RESULTS | 1 | 1 | ALL | | | |
| 534 | StartLoop | 1 | 1 | 3 | | | |
| 535 | StartTest | 1 | 2 | BIGBLUE | TEST_OPROCLM | 32 | PIDLOOP2 |
| 536 | StartTest | 1 | 2 | BIGBLUE | TEST_PVTRAKOPT | 11 | PIDP2P1 |
| 537 | EndLoop | 1 | 0 | | | | |

FIG. 5

| 651 | 652 | 653 | 654 | 655 | 656 | 657 |
|---|---|---|---|---|---|---|
| 611 → <TEST_OPROCLM> | | | | | | |
| 612 → PIDLOOP2.PIDA | MODE | MAN | | MAN | | |
| 613 → PIDLOOP2.PIDA | OP | 50 | | 50 | | |
| 614 → PIDLOOP2.NUM1 | PV | 50 | | 50 | | |
| 615 → PIDLOOP2.PIDA | MODE | AUTO | | AUTO | | |
| 616 → PIDLOOP2.PIDA | OPROCLM | 60 | | 60 | | |
| 617 → PIDLOOP2.NUM1 | PV | 20 | | 20 | | |
| 618 → #OP increasing at 1 unit/sec till it reaches 80 | | | | | | |
| 619 → PIDLOOP2.PIDA | OPROCPOSFL | WAIT FOR 2000 | ON | ON | PASS | |
| 620 → PIDLOOP2.PIDA | OPROCNEGFL | | OFF | OFF | PASS | |
| 621 → #Check if OP is between 50 and 80 | | | | | | |
| 622 → IF Statement | PIDLOOP2.PIDA.OP & PIDLOOP2.PIDA.OP | >50 & <80 | 54 & 56 | PASS | | |
| 623 → PIDLOOP2.PIDA | OP | WAIT FOR 60000 | 80 | 80 | PASS | |
| 624 → PIDLOOP2.PIDA | OPROCPOSFL | | OFF | OFF | PASS | |
| 625 → PIDLOOP2.PIDA | OPROCNEGFL | | OFF | OFF | PASS | |
| 626 → PIDLOOP2.PIDA | OP | | 80 | 80 | PASS | |
| 627 → PIDLOOP2.NUM1 | PV | 50 | | 50 | | |
| 628 → #OP decreasing at 1 unit/sec till it reaches 50 | | | | | | |
| 629 → PIDLOOP2.PIDA | OPROCNEGFL | WAIT FOR 10000 | ON | ON | PASS | |
| 630 → PIDLOOP2.PIDA | OPROCPOSFL | | OFF | OFF | PASS | |
| 631 → #Check if OP is between 80 and 50 | | | | | | |
| 632 → IF Statement | PIDLOOP2.PIDA.OP & PIDLOOP2.PIDA.OP | <80 & >50 | 76 & 76 | PASS | | |
| 633 → PIDLOOP2.PIDA | OP | WAIT FOR 60000 | 50 | 50 | PASS | |
| 634 → PIDLOOP2.PIDA | OPROCPOSFL | | OFF | OFF | PASS | |
| 635 → PIDLOOP2.PIDA | OPROCNEGFL | | OFF | OFF | PASS | |
| 636 → PIDLOOP2.PIDA | OP | | 50 | 50 | PASS | |
| 637 → PIDLOOP2.PIDA | OPROCLM | NAN | | NaN | | |
| 638 → </TEST_OPROCLM> | | | | | | |

*FIG. 6*

| Instruction Identifier | I/O | No Of Args | Arg1 | Arg2 | Arg3 | Arg3 |
|---|---|---|---|---|---|---|
| ProjectSideConfigure | 1 | 1 | BIGBLUE | | | |
| LoadStrategy | 1 | 1 | PIDLOOP1 | | | |
| StartTest | 1 | 2 | BIGBLUE | SET_PROJECT_DATA | | |
| SaveCheckPoint | 1 | 2 | SCE_01 | SET_FB_BEFORE_SAVE | | |
| StratTest | 1 | 2 | BIGBLUE | PID_Test | | |
| RestoreCheckpoint | 1 | 4 | SCE_01 | RESET_FB_AFTER_SAVE | SCE_01_ManO_pTsk | |
| StratTest | 1 | 2 | BIGBLUE | SCE_01 | | drive:/ pathname/ PID_Test |
|  |  |  |  | CHECK_AFTER_RESTORE |  |  |

FIG. 7

| | Block Name | PARAMETER | Value to Set | Expected OP | ActualOP | RESULT(PASS) | RESULT(FAIL) |
|---|---|---|---|---|---|---|---|
| 811 | | | | | | | |
| 812 | | | | | | | |
| 813 | <SET_PROJECT_DATA> | | | | | | |
| 814 | PIDLOOP1.AICA | PV | | 40 | 40 | PASS | |
| 815 | PIDLOOP1.AICA | PV | 50 | Done | Done | PASS | |
| 816 | </SET_PROJECT_DATA> | | | | | | |
| 817 | | | | | | | |
| 818 | | | | | | | |
| 819 | <SET_FB_BEFORE_SAVE> | | | | | | |
| 820 | PIDLOOP1 | EXECSTATE | INACTIVE | INACTIVE | INACTIVE | PASS | |
| 821 | PIDLOOP1.PIDA | PVEUHI | 120 | 120 | 120 | PASS | |
| 822 | PIDLOOP1 | EXECSTATE | ACTIVE | ACTIVE | ACTIVE | PASS | |
| 823 | </SET_FB_BEFORE_SAVE> | | | | | | |
| 824 | | | | | | | |
| 825 | <RESET_FB_AFTER_SAVE> | | | | | | |
| 826 | PIDLOOP1 | EXECSTATE | INACTIVE | INACTIVE | INACTIVE | PASS | |
| 827 | PIDLOOP1.PIDA | PVEUHI | 100 | 100 | 100 | PASS | |
| 828 | PIDLOOP1 | EXECSTATE | ACTIVE | ACTIVE | ACTIVE | PASS | |
| 829 | CEESCE_01 | CEECOMMAND | IDLE | | NONE | | |
| 830 | CEESCE_01 | CEESTATE | | IDLE | IDLE | PASS | |
| 831 | </RESET_FB_AFTER_SAVE> | | | | | | |
| 832 | <CHECK_AFTER_RESTORE> | | | | | | |
| 833 | CEESCE_01 | CEECOMMAND | WARMSTART | | NONE | | |
| 834 | PIDLOOP1.PIDA | PVEUHI | | 120 | 120 | PASS | |
| 835 | PIDLOOP1 | EXECSTATE | INACTIVE | INACTIVE | INACTIVE | PASS | |
| 836 | </CHECK_AFTER_RESTORE> | | | | | | |
| 837 | <END> | | | | | | |

*FIG. 8*

TESTING OF CONTROL STRATEGIES IN A CONTROL SYSTEM CONTROLLING A PROCESS CONTROL PLANT

BACKGROUND OF THE INVENTION

1. Field of the Invention

The present invention generally relates to process control systems, and more specifically to a method and apparatus for testing of control strategies in a control system of a process control plant.

2. Related Art

A process control plant generally contains several equipment (e.g., boilers, filters, furnaces, coolers, etc.), which are used to implement a desired control process (e.g., oil refinery, manufacturing operation, etc.). Each equipment in turn generally includes devices such as actuators (such as valves and switches) and sensors, which are specifically operable facilitating various manufacturing objectives.

A control system is often employed to control such devices. The control system generally issues control commands to the devices on a network and receives the corresponding responses. The commands can change the state of the target device or request status information. The status information can be received without sending commands also, for example, when a variable value exceeds a pre-specified threshold. Additional commands may be issued based on the status information received and/or responses to various commands.

A control system is in general configured with various control strategies, which implement the desired control process by controlling the operation of devices (by issuing the commands noted above). The control strategies are specified by functional blocks connected in a desired manner. The functional blocks perform pre-specified computations (often referred to as an algorithm in the relevant arts, and referred to as control approach below) on the received set of input values, and generate output values associated with corresponding output variables.

There has been a recognized need to test the control strategies at least before deployment in production environments. In one prior embodiment, a tester is provided a suitable user interface to manually select a control strategy, set various variables of the selected strategy to desired values, and start the test for the test case.

Unfortunately, such manual approaches consume substantial amount of test time, and are susceptible to errors as well. The problems are compounded due to the fact that a large number of test cases may need to be used to comprehensively test a control system prior to deployment in a production environment.

BRIEF SUMMARY OF THE INVENTION

Please see sub-section 1 entitled "Overview" under the section entitled, "Detailed Description of the Invention".

BRIEF DESCRIPTION OF THE SEVERAL VIEWS OF THE DRAWINGS

Embodiments of the present invention are described with reference to the accompanying drawings, which are described below briefly.

FIG. 5 is a table illustrating the manner in which pre-defined test cases can be automatically executed on control strategies in an embodiment of the present invention.

FIG. 6 depicts the instructions issued to a control system to perform the tests in one embodiment.

FIG. 7 is a table illustrating the manner in which another pre-defined test case can be automatically executed on control strategies in an embodiment of the present invention.

FIG. 8 depicts the instructions issued to a control system to perform additional tests in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention provides a block tester which receives instructions from a file, with the instructions specifying values for variables of a control strategy employed in a control system. The block tester interfaces with the control system to set the variables accordingly to cause execution of a corresponding test case on the control system.

As the instructions can be defined a priori (beforehand), a test designer can define the content of the file to comprehensively test the control system while reducing errors.

The instructions can be extended to provide various peripheral utilities to testing such as storing the state of a control strategy in a non-volatile memory and restoring the control strategy to the same state later when desired.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
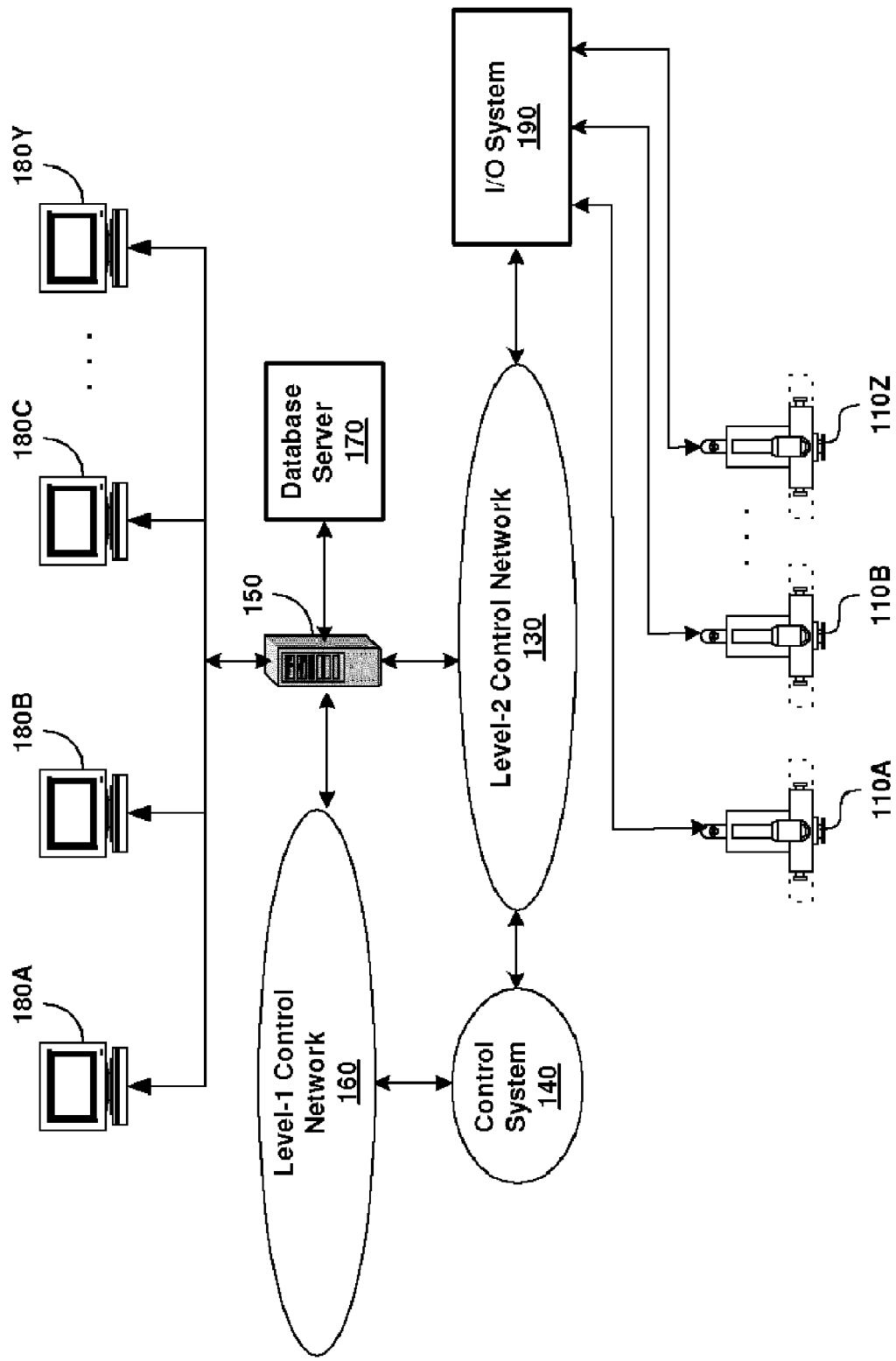
FIG. 1 is a block diagram illustrating the details of an example environment in which various aspects of the present invention can be implemented.

FIG. 1 is a block diagram illustrating the details of an example environment in which several aspects of the present invention can be implemented. The block diagram is shown containing field devices 110A through 110Z, control networks 130 and 160, control system 140, management server 150, database server 170, and client systems 180A through 180Y. Each block is described below in detail.

Client systems 180A-180Y provide a suitable user interface using which an operator can manage/monitor the various devices in the process control plant. In general, an operator may cause issuance of management commands to control system 140 using either client systems 180A-180Y or management server 150. Level-1 control network 160 provides connectivity between management server 150 and control system 140. Level-2 control network 130 provides connectivity between control system 140 and devices 110A-110Z via I/O system 190, using analog/digital input/output signals or protocols such as HART and Foundation FieldBus well known in the relevant arts.

Database server 170 may store various control strategies (including information on the functional blocks, interconnections, initial values for different variables, etc.), which can be loaded into control system 140 after any necessary changes.

Management server 150 receives various interface commands (either from operator stations 180A-180Y or from an operator directly from keyboards) and generates corresponding management commands to control system 140. Management server 150 provides appropriate data for incorporation into various screens displayed at operator stations 110A-110N. The data may be formed from local data (stored with the management server), from database server 170, from control system 140, or from data received from devices 110A-110Z (via control system 140).

In addition, management server 150 may retrieve various control strategies from database server 170 and load the retrieved strategies into control system 140 upon corresponding commands from client systems 180A-180Y.

Devices 110A-110Z represent field devices used for testing control system 140, and operate according to control commands received from control system 140. The devices provide process values (input values for respective variables) to control system 140 or accept output values (of respective output variables) from control system 140. Devices 110A-110B may be replaced by Numeric Blocks to simulate/generate the process values.

Control system 140 generates control commands according to pre-loaded control strategies to control the operation of devices 110A-110Z. The control strategies contain various functional blocks, which generally have pre-defined computational sequences on variables. The execution of a control strategy entails performing such computational sequences using (input) values for input Various aspects of the present invention enable the control strategies to be tested, as described below in further detail. In an embodiment, the tests are performed by an appropriate interface between management server 150 and control system 140 (though the features can be implemented within client systems 180A-180Y as well). Accordingly, the flowchart of FIG. 2 is described with respect to management server 150.

3. Invention

Figure 2:
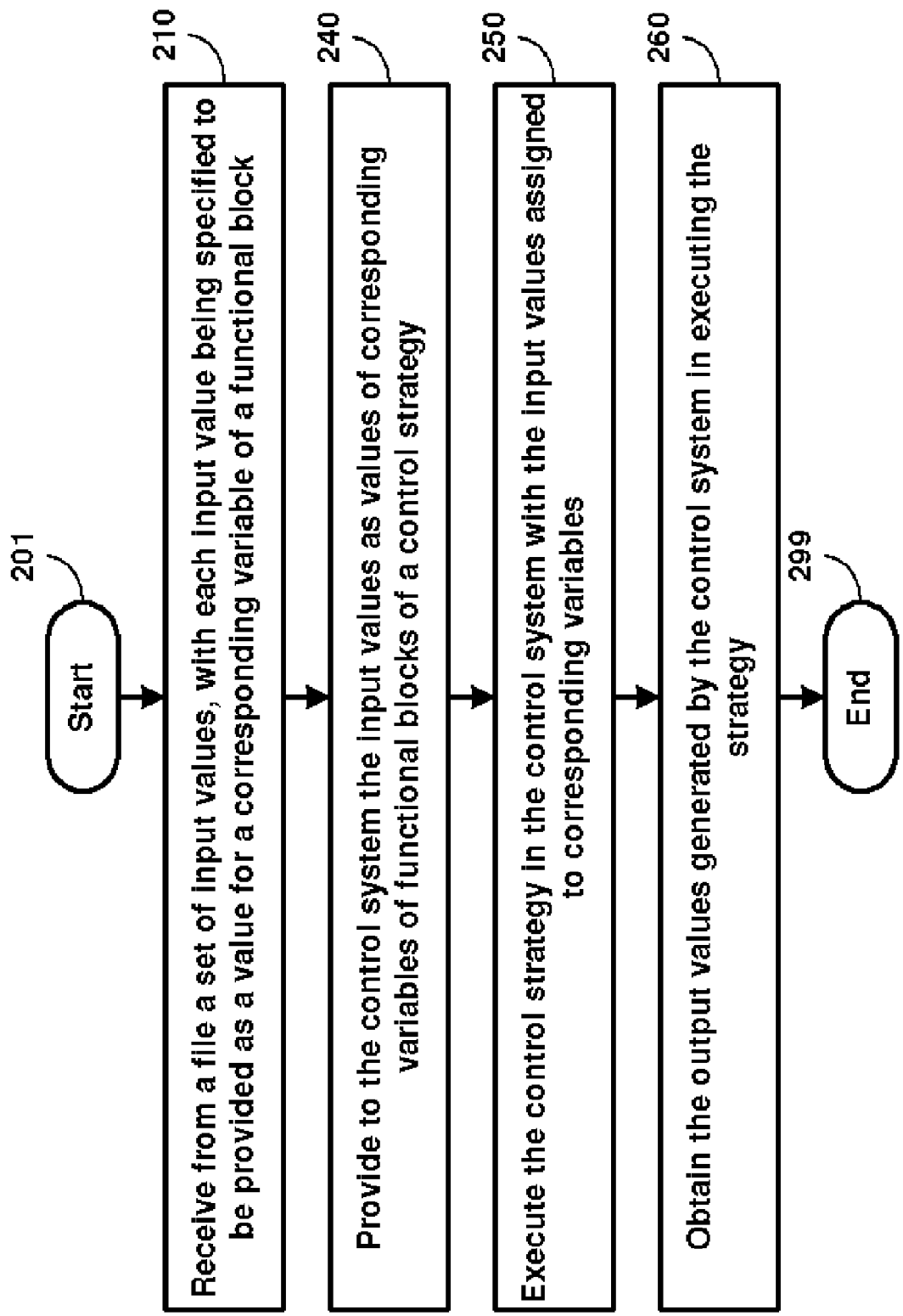
FIG. 2 is a flowchart illustrating the manner in which control strategies are tested in an embodiment of the present invention.

FIG. 2 is a flowchart illustrating the manner in which control strategies may be tested according to an aspect of the present invention. The flowchart is described with respect to FIG. 1 merely for illustration. However, the features can be implemented in various other contexts, as will be apparent to one skilled in the relevant arts by reading the disclosure provided herein. The implementation in such contexts is contemplated to be covered by several aspects of the present invention. The flowchart begins in step 201, in which control immediately passes to step 210.

In step 210, management server 150 receives from a file a set of input values, with each input value being specified to be provided as a value for a corresponding variable of a functional block. The file may be provided internal (e.g., on the secondary storage contained within management server 150) or external to management server 150 (e.g., via a suitable network interface).

In step 240, management server 150 provides to control system 140 the input values as values of corresponding variables of the functional blocks of control strategies. In general, any cooperating interface/protocol can be implemented between management server 150 and control system 140 to facilitate such a feature.

In step 250, control system 140 executes the control strategy with the input values assigned to corresponding variables. In general, execution of the control strategy leads to various output values of the corresponding output variables.

In step 260, management server 150 obtains the output values generated by control system 140 in executing the strategy. The output values (and their relation to the corresponding variables) may also be provided consistent with any cooperating interface/protocol implemented between management server 150 and control system 140. In an embodiment described below, the output values thus obtained are stored in the same file as from which the input values of step 210 are received. The flowchart then ends in step 299.

As the contents of the file can be created a priori with the input values for the corresponding test cases, the test cases can be designed accurately in addition to providing more test cases, which test the control strategies exhaustively.

As noted above, several steps of FIG. 2 are implemented within management server 150 cooperatively with control system 140. Accordingly, the description is continued with respect to the internal details of control system 140 and management server 150 in one embodiment.

4. Management Server

Figure 3:
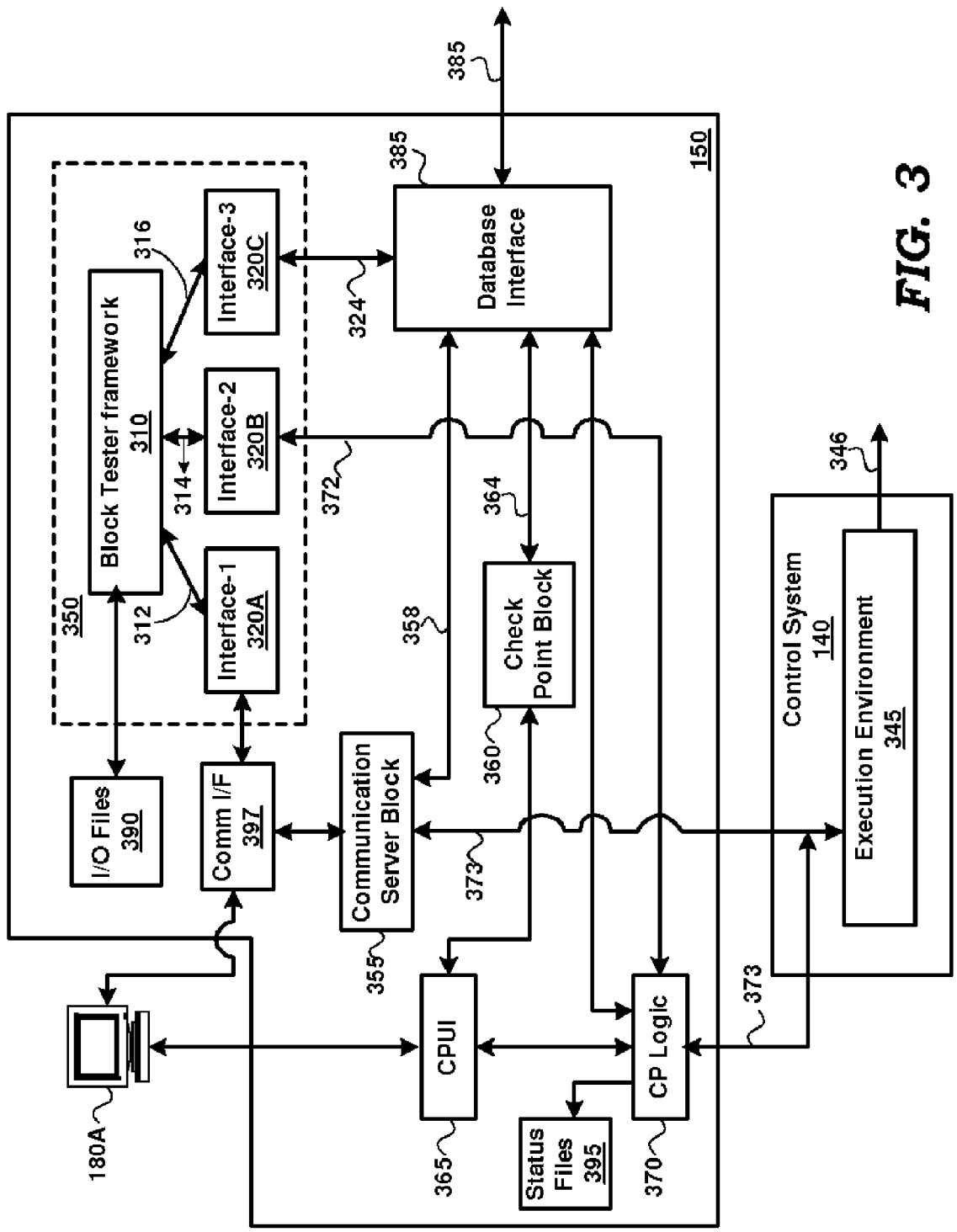
FIG. 3 is a block diagram illustrating the details of a control system and a central server in an embodiment of the present invention.

FIG. 3 is a block diagram illustrating the details of control system 140 and management block 150 in one embodiment. Control system 140 is shown containing execution environment 345, while management block 150 is shown containing block tester 350, communication server block (CS block) 355, check point block (CP block) 360, check point user interface (CPUI) 365, check point logic (CP logic) 370, database interface 385, I/O files 390, and communications interface (Comm I/F) 397. While in FIG. 3, only interactions of client system 180A with control system 140 and management server 150 is shown, it must be understood that any of client systems 180B through 180Y may also interact with control system 140 and management server 150. Each block is described below in further detail.

Database interface 385 facilitates connections/access to database server 170 of FIG. 1 (but not shown in FIG. 3) via path 385. CS block 355 receives commands (via comm I/F 397) from client system 180A to retrieve control strategies and load them to control system 140. In response, CS block 355 retrieves the specified strategies from database server 170 by interfacing via database interface 385(path 358), and uploads, via path 373, the retrieved strategies to control system 140. CS block may also receive commands from client system 180A to change values of parameters of functional blocks of control strategies in database server 170, and causes the corresponding changes to be performed in database server 170 (via database interface 385).

CS block 355 also receives instructions from block tester 350 via interface-1 320A to provide similar features for block tester 350. In particular, CS block 355 converts variable names and any associated values (in packetized form) received from block tester 350 (via Interface-1—320A and comm I/F 397) into handles (which contains a unique identifier enabling a later received response to the presently sent instruction and be processed accordingly), and forwards the same to execution environment 345 on path 373. CS Block 355 also converts handles received on path 373 from execution environment 345 into parameter names, and forwards the same back to block tester 350 (via Interface-1—320A). In case of information which needs to be saved on database server 170 (FIG. 1), the information is sent on path 358 via database interface 385 for storage.

CPUI 365 provides a user interface to client system 180A for configuring the specific instances (checkpoints) at which the state of control strategies are to be saved and restored. CP Logic 370 operates to save and restore, via path 373, the status of control strategies (executed by Execution Environment 345) as requested by client system 180A (via CPUI 365) and block tester 350 (via interface-2 320B). In general, data representing the status of control strategies is stored as files (.cp files) as indicated by status files 395 in management server 150, and retrieved when required. Interface-2 320B may be implemented by taking advantage of the internal details of CP logic 370 in interfacing with CPUI 365.

Execution environment 345 receives commands to load and/or delete various control strategies from block tester 350 via CS block 355, in addition to instructions to set various variables (defining a test case) of the functional blocks/connections of the control strategies. Execution environment 345 then issues control commands to field devices 110A-110Z (shown in FIG. 1) on path 346 consistent with the control strategies. Execution environment 345 can be implemented in a known way. Control System 140 may also contain specific interface blocks (not shown) which provide communication interfaces between execution Engine 345 with other blocks such as CP logic 370 and CS block 355.

Block tester 350 is shown containing block tester framework 310, interface-1 (320A), interface-2 (320B), and interface-3 (320C). Block tester 350 connects to CS block 355 via interface-1 320A for receiving and setting parameter values, and loading and deleting control strategies. Block Tester 350 also connects to database server 170 (of FIG. 1) via Interface-3 (320C) and Database Interface 385 for obtaining (receiving and setting) data related to project configuration.

Block Tester Framework 310 operates to generate and provide test cases for testing control strategies in control system 140 as described above, and also illustrated in sections below with examples. Block Tester Framework 310 typically receives data specifying test strategies/cases from I/O files 390, and uploads the specified strategies to control system 140 via CS block 355. Input files containing the instructions a test designer would include for performing tests according to various aspects of the present invention may be stored in Management Server 150. In an embodiment described below, each input file is specified in the form of a spreadsheet, which can be conveniently edited/viewed using various desktop software programs (such as Microsoft's Excel Software). Block Tester Framework 310 may packetize parameter names (input or output variables of interest pertaining to a control strategy) before forwarding the packets to CS block 355.

The specific data sent and received from/to block tester 350 may be understood by appreciating the manner in which tests are performed according to various aspects of the present invention. The tests in turn are performed on control strategies and accordingly an example control strategy is described first.

5. Example Control Strategy

Figure 4:
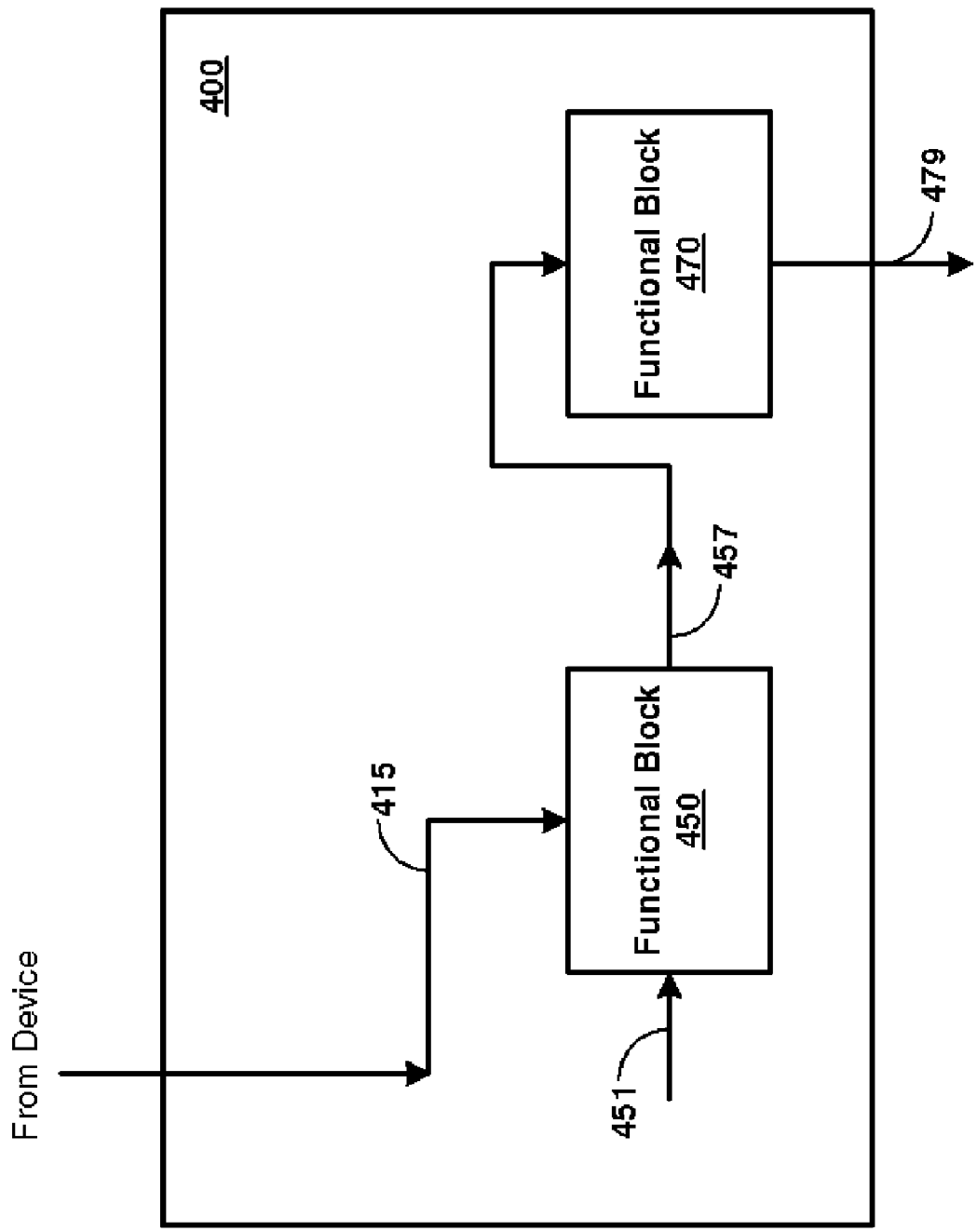
FIG. 4 is a block diagram illustrating the details of an example control strategy.

FIG. 4 is block diagram illustrating the testing of example functional blocks according to various control strategies. The diagram is shown containing functional blocks 450 and 470, with the two functional blocks implementing a control strategy. Functional block 450 performs Proportional Integrator and Derivative (PID) control and is thus referred to as a PID block 450 hereafter. Functional block 470 performs auto/manual transition of the input 457 and is referred to as Auto-Man (AM) block 470 hereafter. Each block is described below in further detail.

PID block 450 is shown receiving process value (PV) 415 as one of the input variables and the set point (SP) 451 as another input variable. The process variable is shown being received from a device (not shown). The process value may alternatively be received from a numeric block that simulates generation of PV 415. Set point may also be received from another function block (not shown) or based on inputs using client systems 180A-180Y.

PID block 450 is shown providing output (OP 457) based on various pre-specified computations (control approach). The output parameter OP is provided based on various internal parameters set within PID block 450, in addition to those shown as being received from external sources. Example set of such parameters is InitMAN, "mode", OPROCLM, OPROCPOSFL, and OPROCNEGFL. Each parameter is described below.

Parameter "mode" defines the mode of control function block PID 450, which may be set to manual, automatic, cascade, etc. In manual mode, OP 457 is set/stored by either the user (operator or a program provided in accordance with an aspect of the present invention). The function block does not generate/set OP in the manual mode, and thus the input values (415, 451 etc.) are ignored. In the automatic mode, the output (OP 457) is computed according to the computational logic within PI D block 450.

Initialization Manual (InitMAN) Flag B When On, it indicates that the function block is in Initialization Manual (described below). INITMAN goes on when either a cascade is broken (i.e., a blocks mode is not Cascade), or initialization is requested by a secondary (described below).

In Cascade, OP of one block is connected to input of another block (In this example, OP 457 of Block 450 is connected to PV of Block 470). In Cascade connection, the upstream block is known as primary (Function Block 450 in this case) and downstream block is known as secondary (Function Block 470 in this case).

During Intialization manual, Block OP 457 is not controlled by the Function Block 450 itself, but is tracked back from the secondary 470 input. A block goes to Initialization, in case secondary Function Block is not allowed to receive the input from primary due to any reason (for example, secondary block 470 is in Manual mode (in manual mode, Function block OP will not be taken from input, but will be set by operator))

OPROCLM represents the set limit for the rate of change of Output (OP) (e.g., 60, in Percent per minute).

OPROCNEGFL is a flag representing whether the negative rate of change of output (OP) is within a limit. The parameter may be set to off or ON. If off, the flag indicates OP negative rate of change is above the limit (OPROCLM) and if ON indicates OP negative rate of change is less-than or equal-to the limit.

OPROCPOSFL is a flag representing whether the positive rate of change of output (OP) is within a corresponding limit (OPROCLM). The parameter may be set to Aoff@ OR AON@. If off, the flag indicates that the change is below the limit and if ON indicates that the rate is above-than or equal-to the limit.

The manner in which PID block 450 of the above control strategy may be tested is illustrated below with reference to FIGS. 5 and 6.

6. Start of Tests

FIG. 5 is a diagram depicting the contents of one of I/O files 390, which can be provided as an input to block tester 350 to perform desired tests in one embodiment. Each line in the file represents an instruction which is issued by block tester 350 to a block specified as a part of the instruction, as described below. The file is shown containing columns 501-507, and rows 531-537. Each column and row is described in further detail below.

Column 501 contains key words which indicate the specific operation to be performed. Column 502 indicates whether the corresponding row is executed (value 1) or disabled in the present test iteration. Column 503 indicates the number of arguments for the row in the subsequent columns. Columns 504 and 505 represent arguments passed (assuming maximum argument count of 2). Column 506 indicates a test case identifier and column 507 indicates the specific strategy on which the test case is to be performed.

Row 531 indicates that default delay to be observed between executions of successive rows of a test case (of FIG. 6, described further below) is 2000 milliseconds. Row 532 indicates that access level/privilege is to be 1 (for example, to ENGINEERING level that permits write operations) during the tests. Row 533 indicates that the results are to be stored for all the iterations of the Loop (StartLoop in row 533) in separate xml (corresponding to a value of ALL in column 504). In response, the results are stored back in the same file, HTML format, xml etc., as well.

Row 534 indicates the start of loop and row 537 indicates the end of the loop. The loop is executed 3 times corresponding to value in arg1 504 in row 534. In rows 535 and 536, the loop is shown specifying two tests cases TEST_OPROCLM and TEST_PVTRAKOPT respectively performing tests on control strategies PIDLOOP2 and PIDP2P1 are present in a file entitled BIGFILE. The content of the file is shown illustrating the test cases below.

7. Test Cases

FIG. 6 is a partial content of file referred in ARG1 504 in one embodiment. Again, each line contains an instruction, which is issued by block tester 350 to control system 140. The content (rows 611-638) depicts the manner in which one of the two referred test cases are defined earlier by a test designer. Rows 618, 621, 628 and 631 contain comments illustrating the test operation performed in corresponding rows below. The content representing the second test case can also be represented similarly after row 638 and is not included for conciseness. As described below in further detail, the test case tests the rate of change of output is within the desired limits, and whether the corresponding flags are accurately set.

As may be appreciated from the description below, in rows 612-617, 619-620, 622-627, 629-630, and 632-637, column 651 represents the functional block in which the corresponding parameter indicated in column 652 needs to be set. Column 653 specifies the desired input value for the input parameter of column 652. Column 654 represents an expected value for the corresponding variable/parameter. Column 655 indicates the actual value of the parameter generated by the conducted test (as described below) and column 656 indicates whether the test, with respect to the corresponding output variable, is a pass or fail. In case of Pass, it is written in column 656 and in case of fail, it is written in column 657.

Row 611 identifies the start of test case TEST_OPROCLM and row 638 identifies the end of the test case by virtue of the/mark. Row 612 sets the variable MODE to MANUAL such that the output OP 457 may be set to a desired value. Row 613 sets OP 457 to an initial value of 50. Row 614 sets PV 415 to 50. In row 615, the mode is changed to AUTO, causing the output (OP 457) to be generated by PID block 350.

In row 616, parameter OPROCLM (defining maximum rate of change of OP 457) is set to a value 60. In row 617, PV 415 is set to 20, thereby causing a decrease in the input value by 30 (from 50). This starts the test since error is generated (by the difference in values of PV 415 and SP 451) and OP 457 is changed by the PID algorithm to 80. Row 618 is a comment indicating that the output OP 457 is designed to increase at a rate of 1 unit per second up to a value of 80.

As OPROCLM is set (in row 616), OP cannot change immediately to 80. It should change as per the defined rate. In row 620, the flag OPROCPOSFL is examined (or the value of the corresponding variable retrieved). As the parameter is expected within 2000 ms, time-out is set to 2000 millisecond for the expected value to be ON. When the flag OPROCPOSFL is retrieved ON, it is compared with the actual value ON, and a result of PASS is logged in column 656. In row 621, the flag OPROCNEGFL is examined to confirm that the output is not ramping in the negative direction, as desired.

As noted above, the initial value of OP was 50 (row 613) and the expected value is 80 as per the control strategy, but due to OPROCLM (defining maximum rate of change of OP 457 being set to 60 in row 616) OP changes slowly from 50 to 80. Row 622 checks whether the value of OP 457 is between 50 and 80. The checking resulted in a PASS result, as shown in row 622.

As per the control strategy, the value of OP is expected to reach 80 after a duration of about 30000 milliseconds. In row 623, OP 457 is examined (by block tester 360 by issuing the appropriate management command to control system 140 through interface-1 320A) every 2000 ms till the timeout limit of 60,000 milliseconds to confirm whether the output value has reached a value of 80. Rows 624 and 625 confirm that the corresponding flags OPROCPOSFL and OPROCNEGFL do not indicate either a ramp-up or a ramp-down, and row 626 confirms that the OP 457 is stable at 80, as expected, and a PASS result is logged in the file, as shown.

Rows 627-636 similarly test for negative ramp by setting the PV value 415 to 50, and examine various output variables as shown. Row 637 sets the OPROCLM to NAN to disable the function.

From the above, it may be appreciated that a test designer may specify various input values for corresponding variables. Block tester 350 issues the instructions in the input file to cause a test case to be performed on a control strategy and also examines the status of variables as specified by the corresponding instructions. It should be appreciated that more complex/simpler conventions can be used to provide corresponding features as desired. For example, the approach can be extended, with use of interface-1 320B and interface-2 320C to provide more complex features as described below with an example.

8. Saving and Restoring State in Control System

FIGS. 7 and 8 illustrate the manner in which a test designer may enable a state of interest to be saved and later restored upon occurrence of an undesired condition. In particular, FIG. 7 is an input file which can be provided to block tester 350 to provide such a feature while executing a test case and FIG. 8 depicts the content of a file which includes the specific instructions of a test case. To avoid obfuscating the relevant features, only some (relevant) portions of the input file are included in the present application. Columns 701-708 respectively operate similar to columns 501-507, and the description is not repeated in the interest of conciseness.

Row 731 contains a key word ProjectSideConfigure, which causes the variables in database server 170 to be pre-set (by issuing of appropriate instructions by block tester 350 via interface 320C and database interface 385) according to the data in file TESTDETAIL by the portion of lines specified by SET_PROJECT_DATA. Row numbers 813-816 of FIG. 8 contain the instructions to check (by issuing appropriate instructions by block tester 350 via CS block 355 and receiving the response via the same block) whether the value of the variable PV (the understanding of which is not necessary for an understanding of the operation of the embodiments) equals 40, and to set it to 50 thereafter.

Row 732 contains a key word Load Strategy, which loads (due to the issuance of appropriate instructions by block tester 350 via CS block 355) the control strategy (with the changed values caused due to Row 731) into control system 140 from database server 170. Row 733 starts a test case in a file entitled BIGFILE, with the instructions (which are issued by block tester 350 via CS block 355) being specified by a marker SET_FB_BEFORE_SAVE. Lines 819-823 of FIG. 8 contain the corresponding instructions which set the variable PVEUHI of functional block PIDA (e.g., akin to block 450 shown in FIG. 4) of control strategy PIDLOOP1 to 120 after setting the variable EXECSTATE to inactive (which permits the value to be changed).

Row 734 contains a key word SaveCheckPoint, which causes the status of control strategy SCE_01 to be saved in a file identified as PID_Test located in Management server 150 (shown as status files 395 in FIG. 3). Block tester 350 may interface with CP logic 370 via interface 320B to obtain such storing.

Row 735 contains the key word StartTest, which causes the instructions in lines 825-830 to be executed as a test case. The instructions cause variable PVEUHI of functional block PIDA to be set to 100. Though not shown in FIG. 7, it is assumed that an undesirable condition has occurred and it is necessary to restore the state of control strategy to prior to execution of row 735.

Row 736 contains the key word RestoreCheckpoint, which causes the state of control strategy SCE_01 to be restored using the data in file PID_test (by appropriate interaction between block tester 350 and CP logic 370). The corresponding entry under column 708 drive:/pathname/PID_Test specifies the filename (PID_Test) and the location in which it is stored. Row 737 contains the key word StartTest, which causes the value of variable PVEUHI to be checked after the restore operation.

Thus, using the instructions such as those described above, a test designer may conveniently design test cases for various control strategies a priori and provide the input files to the block tester to cause the tests to be performed automatically as desired. Though the instructions are provided in different diagrams, it should be appreciated that the instructions can be contained in one or more files according to various conventions, as will be apparent to one skilled in the relevant arts by reading the disclosure provided herein. Such embodiments are contemplated to be covered by various aspects of the present invention.

Also, the features described above can be implemented in various embodiments. The description is continued with respect to an embodiment in which various features of the present invention are operative by execution of appropriate software instructions.

9. Software Implementation

Figure 9:
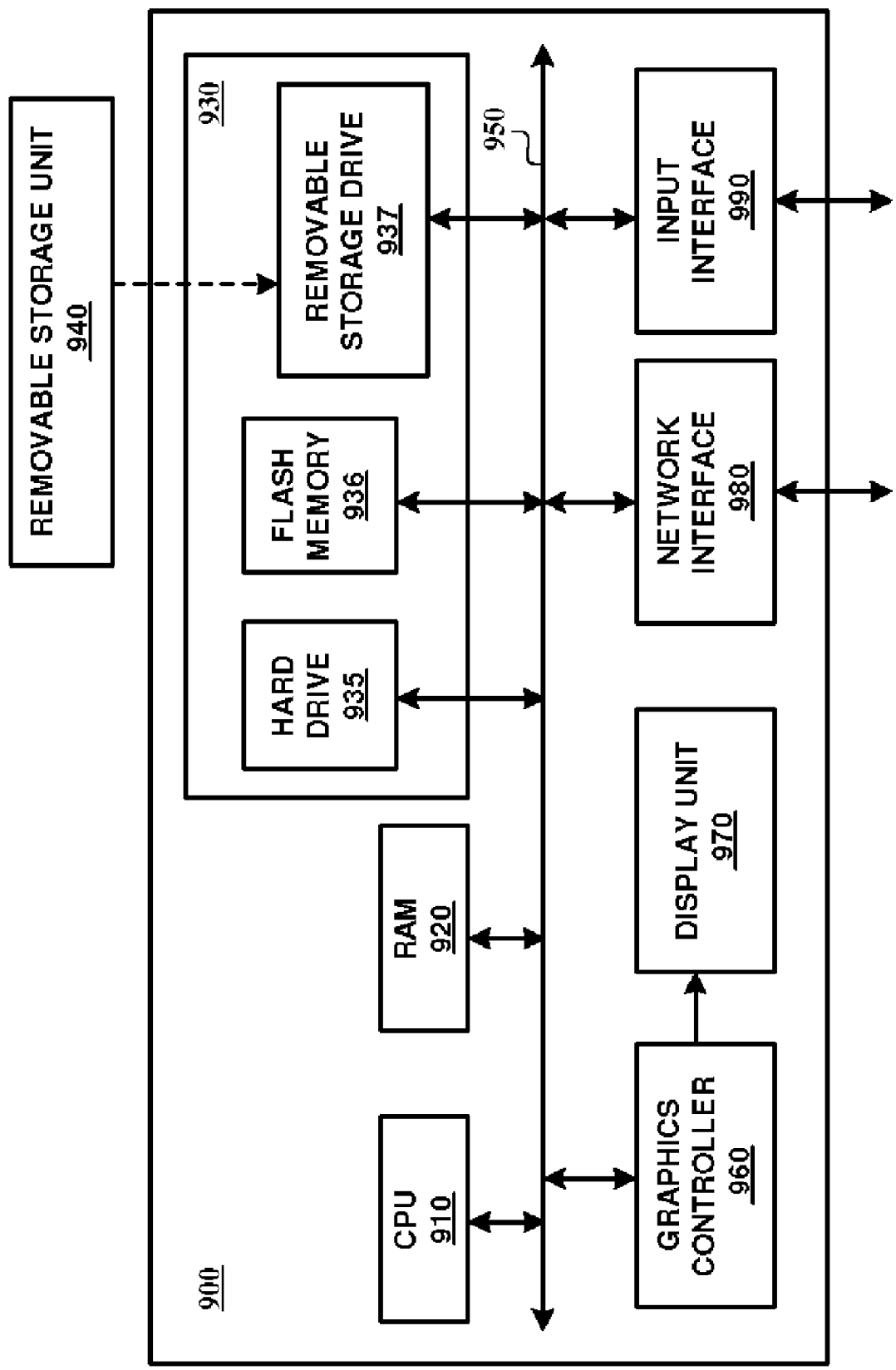
FIG. 9 is a block diagram illustrating the details of an embodiment in which various aspects of the present invention are operative by execution of software instructions in an embodiment of the present invention.

FIG. 9 is a block diagram illustrating the details of digital processing system 900 implemented substantially in the form of software in an embodiment of the present invention. System 900 may correspond to one of operator stations 180A-180Y and central server 150, which cause test cases to be performed on strategies as described above. System 900 may contain one or more processors such as central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary memory 930 using communication path 950, and also supports the objects while the user interface is provided.

Graphics controller 960 generates display signals (e.g., in RGB format) to display unit 970 based on data/instructions received from CPU 910. Display unit 970 contains a display screen to display the images defined by the display signals. Input interface 990 may correspond to a key-board and/or mouse. The display unit and input interface can be used to provide a suitable interface to manage field devices (including causing the test cases to be executed on the control strategies) according to various aspects of the present invention.

Network interface 980 may contain one or more physical interfaces, which provide connectivity to various control networks as well as client systems providing user interface 210. For example, network interface 980 may enable central server 150 to interface with both the control network and a LAN on which client systems are connected.

Secondary memory 930 (characterized by non-volatile storage) may contain hard drive 935, flash memory 936 and removable storage drive 937. Secondary memory 930 may store the data and software instructions, which enable digital processing system 900 to provide several features in accordance with the present invention. Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data.

In this document, the term "computer program product" is used to generally refer to removable storage unit 940 or hard disk installed in hard drive 935. These computer program products are means for providing software to digital processing system 900. CPU 910 may retrieve the software instructions (also referred to as execution statements to differentiate from the instructions in the input files noted in the sections above), and execute the instructions to provide various features of the present invention described above.

10. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of testing a control strategy in a control system, wherein said control strategy contains a set of functional blocks having a plurality of variables and an output variable, said set of functional blocks being designed to generate output values for said output variable from input values received for said plurality of variables according to a control approach, said method comprising:
  receiving from a file a set of input values for a test case, wherein each of said set of input values is specified to be provided for a corresponding one of said plurality of variables,
  wherein said receiving further receives from said file an expected output value for said output variable;
  providing to said set of functional blocks said set of input values as values corresponding to said plurality of variables, wherein said set of functional blocks generates an actual output value for said output variable according to said control approach;
  obtaining said actual output value from said set of functional blocks;
  comparing said expected output value with said actual output value to generate a result of said testing of said set of functional blocks for said set of input values of said test case;
  wherein said file contains an instruction, wherein said providing sends said instruction to said control system and receives a state of said control strategy in response,
  storing said actual output value and said result in said file and said state in a memory,
  wherein said file contains a restore instruction; and
  retrieving said state from said memory, and loading said state to said control strategy in response to said restore instruction to cause said set of functional blocks to a same state as prior to sending said instruction to said control system;
  wherein said receiving receives from said file a wait value associated with said output variable, wherein said obtaining waits a time duration determined by said wait value prior to retrieving said output value for said output variable.

2. The method of claim 1, wherein said receiving receives a first value for a first variable of a first functional block from said file, wherein said first variable is contained in said plurality of variables is set to a CASCADE mode, wherein the input value for said first variable is received as an output value from another functional block in response to setting said first variable to said CASCADE mode, wherein said another functional block is specified by said control strategy, wherein said first functional block and said another functional block are contained in said set of functional blocks.

3. The method of claim 1, wherein said file contains an instruction, wherein said providing sends said instruction to said control system and receives a state of said control strategy in response, said method further comprising storing said state in a memory.

4. The method of claim 3, wherein said file contains a restore instruction, said method further comprising retrieving said state from said memory, and loading said state to said control strategy in response to said restore instruction.

5. The method of claim 4, further comprising:
  executing a test case after said storing of said state in said memory,
  wherein said test case is also specified in said file,
  wherein execution of said test case causes an undesirable condition to occur, and wherein said restore instruction is executed in response to said undesirable condition.

6. The method of claim 1, wherein said file contains a first instruction and a second instruction, said method further comprising setting a second variable of a second control strategy in a database to a corresponding value in response to said first instruction, and loading said second control strategy to said control system in response to said second instruction.

7. The method of claim 1, wherein said result comprises one of pass and fail, wherein said result is set to said pass if said actual output value matches said expected output value and to said fail otherwise.

8. The method of claim 1, further comprising:
  receiving from said file an if condition indicating an instruction to be executed if said if condition is evaluated to be true and not to be executed otherwise, wherein said if condition specifies a comparison of a value received set of functional blocks for said set of functional blocks with a desired value;
  evaluating said condition by comparing said actual output value obtained from said set of functional blocks with said desired value received from said file to determine whether said condition evaluates to true; and
  executing said instruction only if said condition is evaluated to be true and not executing said instruction otherwise.

9. A computer readable medium carrying one or more sequences of execution statements for causing a system to test a control strategy in a control system, wherein said control strategy contains a set of functional blocks having a plurality of variables and an output variable, said set of functional blocks being designed to generate output values for said output variable from input values received for said plurality of variables according to a control approach, wherein execution of said one or more sequences of execution statements by one or more processors contained in said system causes said system to perform the actions of:
  receiving from a file a set of input values for a test case, wherein each of said set of input values is specified to be provided for a corresponding one of said plurality of variables,
  wherein said receiving further receives from said file an expected output value for said output variable;
  providing to said set of functional blocks said set of input values as values corresponding to said plurality of variables, wherein said set of functional blocks generates an actual output value for said output variable according to said control approach;
  obtaining said actual output value from said set of functional blocks;
  comparing said expected output value with said actual output value to generate a result of said testing of said set of functional blocks for said set of input values of said test case;
  wherein said file contains an instruction, wherein said providing sends said instruction to said control system and receives a state of said control strategy in response,
  storing said state in a memory and said actual output value and said result in said file; and
  wherein said file contains a restore instruction,
  retrieving said state from said memory, and loading said state to said control strategy in response to said restore instruction to cause said set of functional blocks to a same state as prior to sending said instruction to said control system; and
  wherein said receiving receives from said file a wait value associated with said output variable, wherein said obtaining waits a time duration determined by said wait value prior to retrieving said output value for said output variable.

10. The computer readable medium of claim 9, wherein said receiving receives a first value for a first variable of a first functional block from said file, wherein said first variable is contained in said plurality of variables is set to a CASCADE mode, wherein the input value for said first variable is received as an output value from another functional block in response to setting said first variable to said CASCADE mode, wherein said another functional block is specified by said control strategy, wherein said first functional block and said another functional block are contained in said set of functional blocks.

11. The computer readable medium of claim 9, wherein said contains a first instruction and a second instruction, further comprising one or more execution statements for setting a second variable of a second control strategy in a database to a corresponding value in response to said first instruction, and loading said second control strategy to said control system in response to said second instruction.

12. The computer readable medium of claim 9, wherein said result comprises one of pass and fail, wherein said result is set to said pass if said actual output value matches said expected output value and to said fail otherwise.

13. The computer readable medium of claim 9, further comprising:
 executing a test case after said storing of said state in said memory,
 wherein said test case is also specified in said file,
 wherein execution of said test case causes an undesirable condition to occur, and wherein said restore instruction is executed in response to said undesirable condition.

14. The computer readable medium of claim 9, further comprising:
 receiving from said file an if condition indicating an instruction to be executed if said if condition is evaluated to be true and not to be executed otherwise, wherein said if condition specifies a comparison of a value received set of functional blocks for said set of functional blocks with a desired value;
 evaluating said condition by comparing said actual output value obtained from said set of functional blocks with said desired value received from said file to determine whether said condition evaluates to true; and
 executing said instruction only if said condition is evaluated to be true and not executing said instruction otherwise.

15. An apparatus for testing a control strategy in a control system, wherein said control strategy contains a set of functional blocks having a plurality of variables and an output variable, said set of functional blocks being designed to generate output values for said output variable from input values received for said plurality of variables according to a control approach, said apparatus comprising:
 means for receiving from a file a set of input values for a test case, wherein each of said set of input values is specified to be provided for a corresponding one of said plurality of variables,
 wherein said means for receiving further receives from said file an expected output value for said output variable;
 means for providing to said set of functional blocks said set of input values as values corresponding to said plurality of variables, wherein said set of functional blocks generates an actual output value for said output variable according to said control approach
 means for obtaining said actual output value from said set of functional blocks;
 means for comparing said expected output value with said actual output value to generate a result of said testing of said set of functional blocks for said set of input values of said test case;
 means for storing said actual output value and said result in said file,
 wherein said file specifies a save checkpoint instruction, wherein said providing sends said save checkpoint instruction to said control system and receives a state of said set of functional blocks in response, means for storing said state in a non-volatile memory upon receipt of said state; and
 wherein said file further contains a restore instruction after said save checkpoint instruction, at least one another intermediate instruction being contained between said save checkpoint instruction and said restore instruction;
 means for retrieving said state from said non-volatile memory, and loading said state to said control strategy in response to said restore instruction to cause said set of functional blocks to be restored to a state just prior to sending of said save checkpoint instruction; and
 means for executing said at least one another intermediate instruction between said restore instruction and said save checkpoint instruction,
 wherein said means for receiving is operable to receive from said file a wait value associated with said output variable, wherein said means for obtaining is operable to wait a time duration determined by said wait value prior to retrieving said output value for said output variable.

16. The apparatus of claim 15, wherein said result comprises one of pass and fail, wherein said result is set to said pass if said actual output value matches said expected output value and to said fail otherwise.

17. The apparatus of claim 15, further comprising:
 means for receiving from said file an if condition indicating an instruction to be executed if said if condition is evaluated to be true and not to be executed otherwise, wherein said if condition specifies a comparison of a value received set of functional blocks for said set of functional blocks with a desired value;
 means for evaluating said condition by comparing said actual output value obtained from said set of functional blocks with said desired value received from said file to determine whether said condition evaluates to true; and
 means for executing said instruction only if said condition is evaluated to be true and not executing said instruction otherwise.

* * * * *